Feb. 26, 1952 T. SCHMADER 2,587,232
SHAPE CUTTING MACHINE ARM
Filed June 13, 1949 2 SHEETS—SHEET 2

Inventor
Thomas Schmader
By Arthur H Sturges
Attorney

UNITED STATES PATENT OFFICE 2,587,232

SHAPE CUTTING MACHINE ARM

Thomas Schmader, Omaha, Nebr.

Application June 13, 1949, Serial No. 98,679

1 Claim. (Cl. 33—24)

This application is a continuation in part of my prior application having the Serial No. 41,988, now abandoned.

This invention relates to shape cutting machines and more particularly it is an object of this invention to provide a slidable mounting for template holders of such machines.

Shape cutting machines are well known in the art and one of this type is described in Patent No. 2,178,938 titled "Cutting Machine," issued November 7, 1939. Shape cutting machines of this type are provided with movably mounted torches and are further provided with platforms for supporting materials to be cut. Such machines are further provided with template holders and with means for causing the torch to follow a path similar to the shape of a template.

These machines of the prior art have a disadvantage however, in that the template holders thereof are rigidly fixed on a template carrying arm. This construction makes it impossible for the template to be moved to various positions with respect to the work supporting parts of the machine, whereby it is impossible to attain a maximum efficiency.

It is, therefore, an object of the invention to provide an arm for a machine of the type described from which a template can be supported in any one of a plurality of positions along the arm.

A further object of the invention resides in the provision of a machine having an arm as described, slidably secured to a post of the machine whereby the arm can be moved upwardly or downwardly with respect to the remainder thereof at desired times and for the adjustment of the position of the template.

A further object of the invention resides in the provision of a track follower for following a trackway on the arm, a template being supported by the follower in a manner whereby the template can be removed upwardly or downwardly with respect to the track follower.

Another object of the invention resides in the provision of a particular type of open construction used in the template supporting arm wherein track members are provided on opposite sides of the longitudinal opening on the arm for receiving a track follower thereon.

Yet another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 1:
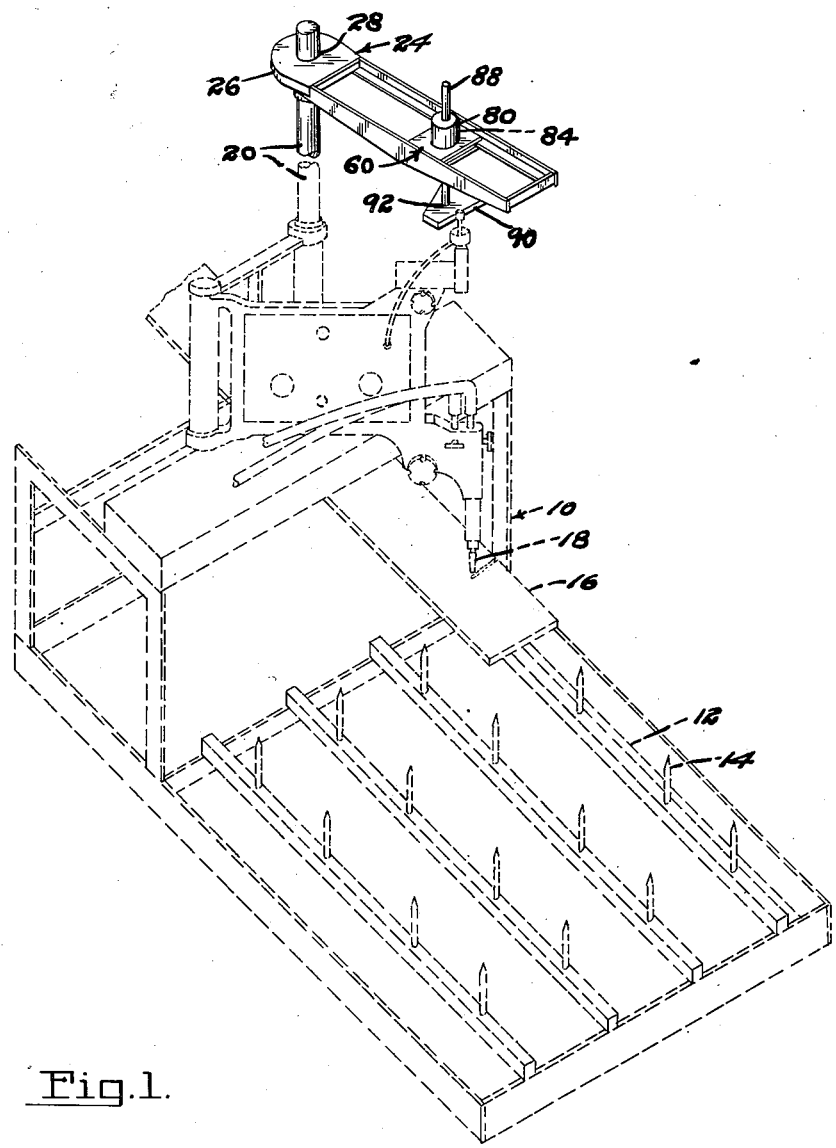
Figure 1 is a perspective view of a shape cutting machine shown in dotted lines, a post of the machine being partially shown in full lines, and a template supporting arm of this invention being mounted upon the post.
Figure 2:
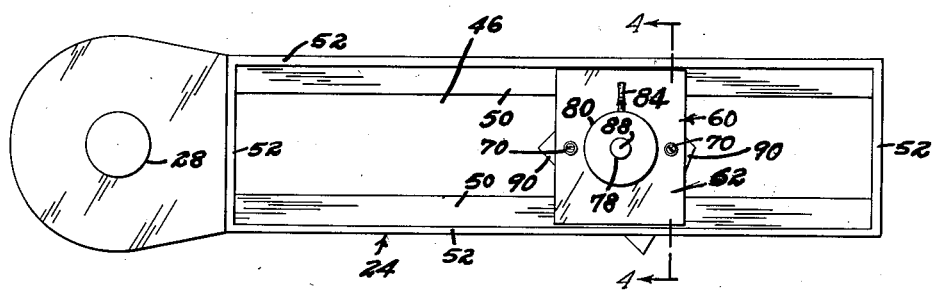
Figure 2 is a top plan view of the template supporting arm, track follower, and template shown in Figure 1.

The shape cutting machine of this invention is of the type described in detail in the patent to Ohmstede, 2,178,938, with the exception that the frame of the machine shown in dotted lines at 10 in Figure 1 is provided with a bed 12 having upwardly extending spikes 14 for supporting the work 16 at such a distance from the remainder of the bed 12 that the cutting torch 18 will not cut the frame of the shape cutting machine itself.

The shape cutting machine 10 is provided with an upstanding cylindrical post 20 which latter has its lower end shown in dotted lines in Figure 1 and its upper end shown in full lines.

The purpose of the post 20 is to receive a template supporting arm generally indicated at 24. The arm 24 is provided with a substantially semicircular rearward portion or base 26 having an aperture 28 therethrough for snugly and slidably receiving the post 20.

The portion 26 is further provided with a downwardy extending attached collar or hub 34 snugly and slidably disposed about the post 20. The collar 34 is provided with a threadedly mounted screw 36 which latter is adapted to bear against the post 20, when tightened, for holding the arm 26 in a desired position with respect to the post 20.

The portion 26 is secured to an elongated arm portion 38 and the arm 24 is further upheld by bracing members 40 extending outwardly and upwardly from the collar 34 to the portion 26.

The portion 38 is provided with an elongated opening 46 in the center thereof, bounded on two sides by two elongated parallel track bars having webs 50.

The webs 50 are secured to and surrounded by a plurality of vertically disposed flanges 52 providing T-shape side bars which latter are secured together with straight bars at the ends in a box-like configuration to provide a horizontally disposed frame.

Figure 3:
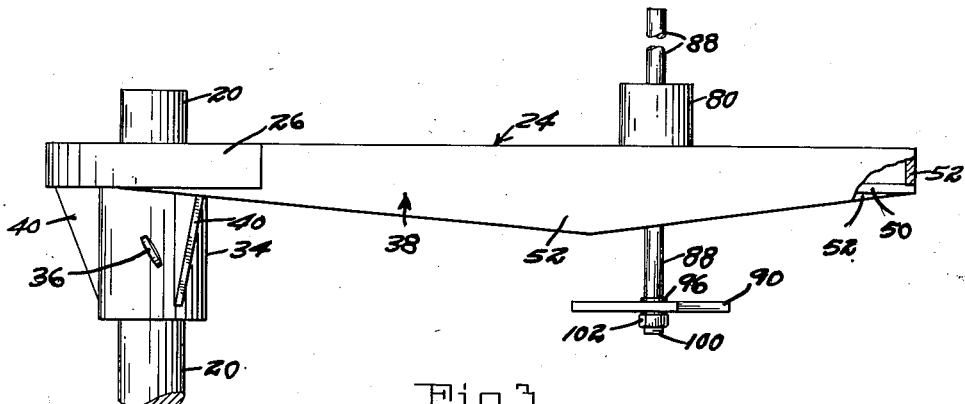
Figure 3 is a side elevation of the parts shown in Figure 2, a lower portion of the arm carrying post being broken away, and a forward portion of the arm being broken away for showing the construction thereof.
Figure 4:
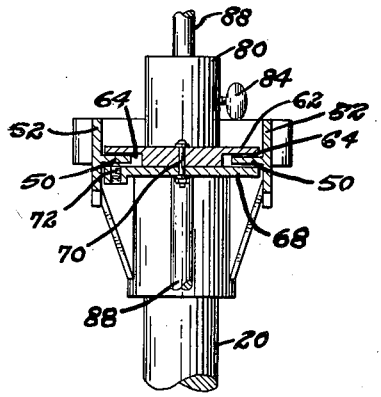
Figure 4 is a view-in-section taken along the line 4—4 of Figure 2.

The bars can be formed integral with the members 52 if desired, and the two longitudinal members 52 are preferably wider at the center thereof than at their ends, as best seen in Figure 3, for providing a maximum strength with a minimum weight.

A track follower or sliding head 60 is provided having an upper portion 62 having parallel recesses 64 therein for receiving the bars 50.

The follower 60 is further provided with a bottom member 68 which latter extends across the bottom of the recesses 64 for maintaining the follower in position about the bars 50. The member 68 is secured by means of bolts 70 to the member 62. The member 68 can have one or more set screws 72 threadedly disposed therethrough, if desired, for bearing against the underside of a bar 50 so that the follower 60 will snugly engage the track bars 50.

The members 62 and 68 are preferably provided with aligned apertures therethrough which are also disposed in alignment with the bore 78 of a sleeve or hub 80.

The sleeve 80 is secured to the member 62 and is provided with a banjo screw 84 threadedly disposed therethrough at a right angle with respect to the bore 78.

A template supporting rod 88 is provided and is snugly received through the bore 78. The lower end of the rod 88 extends downwardly to and through a template 90.

The template 90 has an aperture 92 therethrough for receiving the rod 88.

The rod 88 is provided with a shoulder 96 spaced upwardly from its bottom end for engaging the template 90 on the upper side of the latter. Below the shoulder 96, the rod is threaded at 100, and is provided with a nut 102 which latter is adapted to compress the template 90 upwardly against the shoulder 96.

In operation, it will be seen that the template supporting arm of this invention is adapted to permit the track follower 60 to be moved longitudinally thereof for disposing the template 90 in a desired position and for accommodating different sizes of templates 90.

Also, the template 90 can be moved further toward or away from the arm 24, as desired, by loosening and tightening the set screw 84.

Still further adjustments can be made by shifting the whole arm 24 into a desired position upon the post 20 by loosening and tightening the set screw 36.

From the foregoing description it is thought to be obvious that a shape cutting machine arm constructed in accordance with my invention is particularly well adapted for use by reason of the convenience and facility with which it may be assembled and operated, and it will also be obvious that my invention is susceptible of some change and modification without departing from the principals and spirit thereof, and for this reason, I do not wish to be understood as limiting myself to the precise arrangement and formation of the several parts herein shown in carrying out my invention in practice, except as claimed.

I claim:

In an adjustable template support, the combination which comprises an elongated horizontally disposed frame, rectangular-shaped in plan having parallel side bars, connected at the ends with cross bars, said side bars being T-shaped in cross section having vertically disposed flanges with horizontally positioned webs extending from intermediate parts of the flanges, a vertically disposed cylindrical post, a hub positioned on one end of said frame and having a vertically disposed bore therethrough through which said cylindrical post extends whereby the frame is vertically adjustable on the post and also adapted to swing laterally around the post, a sliding head having parallel horizontally disposed slots in the edges positioned with the webs of the side bars extending into said slots whereby the sliding head is longitudinally slidable in the frame, said sliding head having a hub with a vertically disposed bore therethrough positioned thereon, and a vertically disposed template supporting rod extended through the bore of the hub of the sliding head whereby said template supporting rod is vertically adjustable and also rotatable in said sliding head.

THOMAS SCHMADER.

REFERENCES CITED

The following references are of record in the file of this patent:

UNITED STATES PATENTS

| Number | Name | Date |
|---|---|---|
| 985,978 | Coxhead | Mar. 7, 1911 |
| 1,003,043 | Goughnour | Sept. 12, 1911 |
| 1,101,966 | Schoenky | June 30, 1914 |
| 1,245,360 | Lutz | Nov. 6, 1917 |
| 1,335,347 | Moulds | Mar. 30, 1920 |
| 1,582,033 | Godfrey | Apr. 27, 1926 |
| 1,702,381 | Duran | Feb. 19, 1929 |
| 2,063,776 | Wozny | Dec. 8, 1936 |
| 2,178,938 | Ohmstede | Nov. 7, 1939 |
| 2,367,582 | Honyoust | Jan. 16, 1945 |